Sept. 27, 1949.    J. F. JAWOROWSKI ET AL    2,483,096
BORING TOOL

Filed Sept. 16, 1946

INVENTOR.
JOSEPH F. JAWOROWSKI
& NORBERT JAWOROWSKI
By Bosworth & Sessions
ATTORNEYS Patented Sept. 27, 1949

2,483,096

UNITED STATES PATENT OFFICE 2,483,096

BORING TOOL

Joseph F. Jaworowski, Cleveland, and Norbert Jaworowski, Lakewood, Ohio

Application September 16, 1946, Serial No. 697,284

6 Claims. (Cl. 279—5)

This invention relates to tool holders and more particularly to an adjustable boring tool holder especially adapted for machining operations which involve boring holes by means of a cutting tool which is rotated relative to the work, or vice versa, to take a cut from the inside of the hole being bored.

In machine shop practice it frequently occurs that a hole must be finished accurately to an exact size. One way of accomplishing this is to drill the hole smaller than finished size and then ream to the desired dimension. It may occur however that a reamer of the desired size is not available in which case the hole may be finished to size by boring. With the usual, non-adjustable, boring tool the work is rotated while the tool is fed through the hole to take off a cut. This requires a tool support which may be adjusted transversely of the hole and is not practical or convenient with large parts or those which are difficult to mount. Also many small shops do not have boring machines of the type required to do this kind of work.

It is an object of our invention to provide an improved adjustable tool holder, particularly suited for boring applications, which may be mounted in the rotating spindle of a milling machine or drill press, or in a lathe tail stock or screw machine. Other objects of our invention include: the provision of a tool holder which may be adjusted to bore holes varying in diameter through a substantial range; the provision of an adjustable boring tool for use in various types of machine tools which may quickly be adjusted to bore different diameter holes and which, when in adjusted position is rigidly locked in such a manner that vibration and chattering of the tool is prevented, and; the provision of an inexpensive, simple, easily adjusted, and rugged tool holder of the type described which may be accurately set to bore a hole of any desired size within a given range.

The above and other objects of our invention will appear from the following description of a preferred form thereof, reference being had to the accompanying drawings in which.

Figure 5:
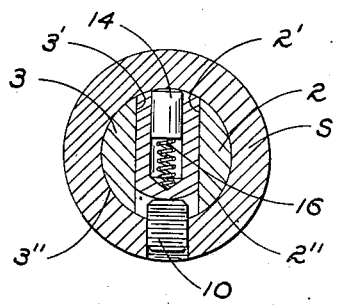
Figure 5 is a transverse cross-sectional view taken on line 5—5 of Figure 1.

As illustrated in the drawings, our tool holder comprises a yoke member Y having a shank portion 1 at its upper or outer end and a pair of spaced leg portions 2 and 3 at its opposite end. The shank 1 may be secured in the spindle of a vertical or horizontal milling machine, drill press, or other machine tool by any suitable means. As is best seen in Figure 5, the legs 2 and 3 have parallel inner surfaces 2' and 3' and cylindrical outer surfaces 2" and 3". Pivotally supported on a pin 4, which extends into suitable holes in the legs 2 and 3, is the tool holder bar 5. The width of the bar 5 is substantially the same as the gap between the legs 2 and 3, a sliding fit being maintained therebetween so that the bar 5 may be adjusted as will later appear.

Surrounding the lower portion of the yoke Y is a sleeve S having a bore 6 within which the legs 2 and 3 fit. The surfaces 2" and 3" of the legs 2 and 3 engage the surface of bore 6 but the pin 4 is preferably shorter than the diameter of bore 6 to avoid engagement therebetween and facilitate assembly. In order to secure the sleeve S in position on the yoke Y and present relative axial movement between these parts a retaining screw 7 is provided which has threaded engagement in a suitable hole in the yoke Y but has a sliding fit in a corresponding hole in the sleeve S. Thus, as is best seen in Figure 3, although the sleeve S cannot move longitudinally on the yoke Y, movement of the yoke Y and particularly the legs 2 and 3 thereof in a direction transverse to the axis of the pin 4 is not restricted.

In order to vary the angular position of the tool holder bar 5 and tool 12 relative to the extended axis 8 of the shank 1, a pair of adjusting screws 9 and 10 are provided which have threaded engagement in suitable holes extending through the wall of the sleeve S on opposite sides of the pin 4. The axes of screws 9 and 10 extend transversely of and substantially normal to the axis of pin 4 and generally parallel to the inner surfaces 2' and 3' of legs 2 and 3. The lower end of the bar 5 is bored at 11 to provide a socket to receive the shank of a tool 12 and the set screw 13 is adapted to clamp the tool in position. One side of the shank of the tool 12 may be slightly flattened as seen in Figure 3 to form a seat for the end of the set screw 13 and prevent rotation of the tool 12 in the holder bar 5.

Figure 2:
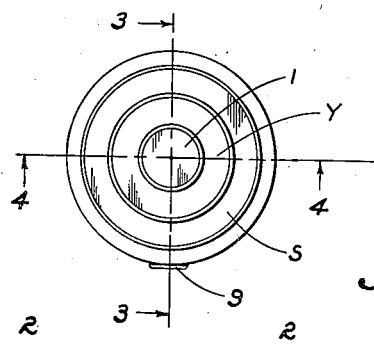
Figure 2 is an end elevation looking at the top of the tool holder and taken substantially on line 2—2 of Figure 1.
Figures 1, 3, 4:
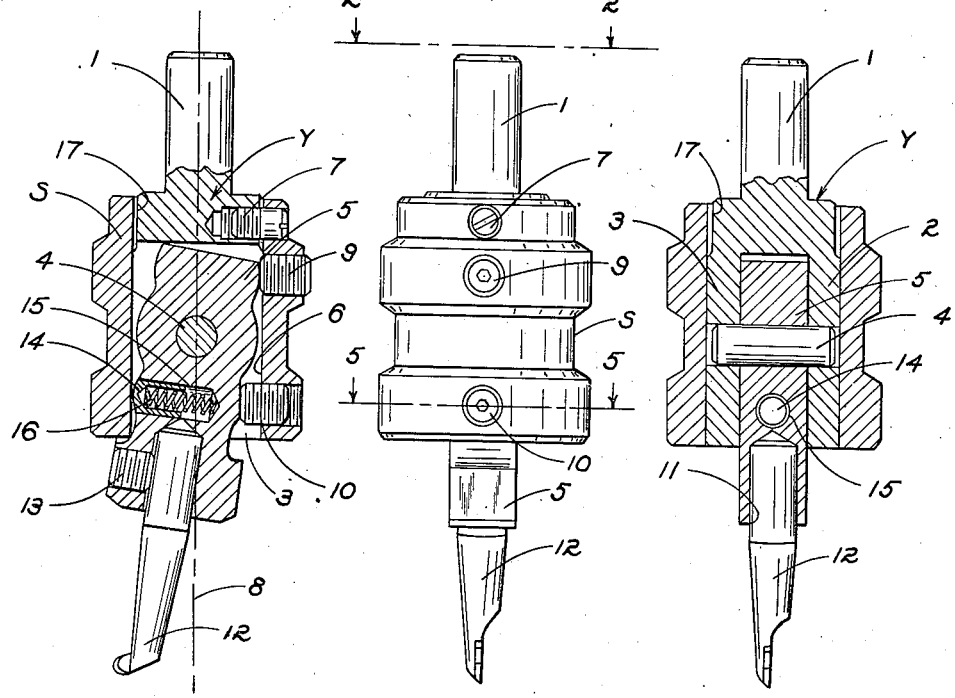
Figure 1 is a side elevation of our tool holder with a boring tool mounted therein.
Figure 3 is a vertical cross-sectional view through our improved tool holder taken on line 3—3 of Figure 2, the tool being shown in position to bore a hole of maximum diameter.
Figure 4 is a vertical cross-sectional view, generally similar to Figure 3 but taken at 90° to Figure 3 on line 4—4 of Figure 2.

In Figures 1, 2, and 3 the bar 5 and tool 12 are shown in their maximum angular position relative to the center line 8 of the shank 1. It will be understood that when in this position the apparatus will be set to bore a hole of maximum diameter. If it is desired to adjust the bar 5 and tool 12 to bore a smaller hole, or take a lighter cut, the screw 10 will be loosened or withdrawn and the screw 9 tightened or screwed inwardly through the sleeve S. In order to facilitate adjustment of the position of the bar 5 a spring pressed plunger 14 has a sliding fit in a hole 15 in the bar 5 and is urged outwardly by a compression spring 16. The plunger 14 always tends to urge the bar 5 in a counter-clockwise direction as seen in Figure 3. As the set screw 10 is withdrawn the plunger 14 will cause the holder bar 5 to remain in contact with the end of the set screw 10, thus facilitating setting and adjustment of the tool.

As noted above, after the set screw 10 is positioned to place the holder bar 5 in the desired angular relation to the center line 8 of the shank 1, the set screw 9 is tightened against the upper end of the bar 5. Thus the screws 9 and 10 will hold the bar 5 firmly against the pin 4 eliminating any play or lost motion which may be present between the pin 4 and the bar 5. Furthermore, when the screws 9 and 10 are tightened against the bar 5 they will act through the pin 4 to urge the leg portions 2 and 3 of the yoke Y toward the opposite side of the sleeve S. As this pressure is applied to the legs 2 and 3 they are wedged together due to the inwardly tapering form of their outer surfaces and the corresponding form of the bore 6 in the sleeve 8. This wedging action will cause the inner surfaces 2' and 3' of the legs 2 and 3 to grip the outer surfaces of the bar 5, thus providing an additional lock against movement of bar 5 relative to the other parts and making an exceedingly rigid and completely chatter-proof tool holder unit. This clamping or wedging action on the legs 2 and 3 is facilitated by slightly relieving the yoke Y at 17 so that only the leg portions of the yoke Y are in contact with the inner bore 6 of the sleeve S.

It will be seen from the above description that our boring tool holder may readily and accurately be adjusted through a substantial range to vary the position of the cutting tool 12 relative to the center line of the tool holder shank 1. It will be understood that the degree of possible adjustment may be increased or decreased by varying the proportion of the parts of our tool holder assembly. Our device may, of course, be made in various sizes and with either a straight or tapered shank portion 1 and the means for securing a cutting tool in the holder bar 5 may be varied as desired. It will further be understood that although we have illustrated the adjusting screws 9 and 10 as adapted both to lock the holder bar 5 against pivotal movement about the pin 4 and to exert the wedging force which takes up any play or looseness between the yoke Y and sleeve S and causes the legs 2 and 3 to grip the bar 5, in some cases it might be desirable to provide supplementary means to exert a force between the sleeve S and the spaced apart legs of the yoke Y to cause the wedging action to occur.

Therefore, although we have described the illustrated embodiment of our invention in considerable detail it will be understood by those skilled in the art that variations and modifications may be made in the form, arrangement, and proportions of the parts and we, therefore, do not wish to be limited to the particular device herein illustrated and described but claim as our invention all forms thereof coming within the scope of the appended claims.

We claim:

1. In a tool holder of the type described a yoke member having a shank portion at one end, a tool holder bar pivotally supported in said yoke, a sleeve disposed around said yoke member, means for securing said yoke against axial movement in said sleeve, and adjustable means for locking said bar against movement relative to said yoke and sleeve.

2. A tool holder comprising a sleeve having a cylindrical bore extending therethrough, a yoke member having spaced legs disposed within said bore and a shank portion extending in the opposite direction from said legs, means for securing said legs of said yoke against axial movement in said bore of said sleeve, a pin extending between the legs of said yoke, a tool holder bar supported on said pin for limited movement about the axis thereof, tool holding means at one end of said bar, and adjustable means for engaging said bar and adjustably securing same against movement about the axis of said pin.

3. In a tool holder of the type described, a yoke member having a shank portion at one end and spaced legs at the other end, the outer surfaces of said legs being generally cylindrical, a sleeve having a cylindrical bore adapted to fit over said spaced legs, means for securing said sleeve to said yoke with the spaced legs of the yoke disposed in the bore of the sleeve, said securing means being adapted to restrain axial movement while permitting limited transverse movement of said yoke in said bore, a tool holder bar pivotally supported between the legs of said yoke for limited oscillating movement, adjustable means for securing said bar against pivotal movement relative to said yoke, said adjustable securing means also being adapted to urge said yoke legs transversely of said bore whereby said legs will be wedged together by said sleeve and caused to grip said bar, and tool holding means at the outer end of said bar.

4. In a tool holder of the type described, a slotted yoke having spaced legs, said legs having parallel inner surfaces, a pin extending transversely across between said legs, a tool holder bar pivotally supported on said pin between said legs, the thickness of said bar being substantially equal to the distance between said parallel surfaces of said spaced legs, a sleeve member secured to said yoke and surrounding the legs thereof, means for preventing relative axial movement between said yoke and said sleeve, and adjusting screws extending through and having threaded engagement with said sleeve and engaging the same side of said bar but on opposite sides of said pin whereby when said screws are tightened against said bar pivotal movement of said bar will be prevented, the axes of said screws being substantially parallel to said inner surfaces of said legs.

5. In a tool holder of the type described, a slotted yoke having spaced legs, said legs having parallel inner surfaces, a pin extending transversely across between said legs, a tool holder bar pivotally supported on said pin between said legs, the thickness of said bar being substantially equal to the distance between said parallel surfaces of said spaced legs, a sleeve member secured to said yoke and surrounding the legs thereof, adjusting screws extending through and having threaded engagement with said sleeve and engaging the same side of said bar but on opposite sides of said pin whereby when said screws are tightened against said bar pivotal movement of said bar will be prevented, the axes of said screws being substantially parallel to said inner surfaces of said legs, and spring means tending to rotate said bar in one direction about said pivotal support and to hold said bar in engagement with one of said adjusting screws.

6. A tool holder comprising a yoke member having spaced leg portions, a tool holder bar pivotally supported in said yoke between said spaced leg portions, a sleeve disposed around said yoke member, means for securing said sleeve member against axial movement in said sleeve while permitting transverse movement thereof in said sleeve, and means for urging said yoke member transversely of said sleeve in a direction substantially normal to the axis of the pivotal support of said tool holder bar whereby said yoke legs will be clamped against said tool holder bar.

JOSEPH F. JAWOROWSKI.
NORBERT JAWOROWSKI.

REFERENCES CITED

The following references are of record in the file of this patent:

UNITED STATES PATENTS

| Number | Name | Date |
|---|---|---|
| 524,375 | Blue | Aug. 14, 1894 |
| 1,980,178 | Berglund | Nov. 13, 1934 |
| 2,369,875 | Wanelik | Feb. 20, 1945 |

FOREIGN PATENTS

| Number | Country | Date |
|---|---|---|
| 93,037 | Switzerland | Dec. 9, 1920 |